P. R. TOTTEN.
Wheel Cultivator.

No. 83,569.

Patented Oct. 27, 1868.

P. R. TOTTEN, OF ADAMS, ILLINOIS.

Letters Patent No. 83,569, dated October 27, 1868.

IMPROVEMENT IN CULTIVATORS.

The Schedule referred to in these Letters Patent and making part of the same.

*To all whom it may concern:*

Be it known that I, P. R. TOTTEN, of Adams, in the county of Adams, and State of Illinois, have invented a new and useful Improvement in Sulky-Cultivators; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

This invention relates to a new and improved sulky-cultivator, for cultivating crops grown in hills or drills.

It consists in a novel construction and arrangement of parts, as hereinafter fully shown and described, whereby light or easy draught is obtained, the plows readily adjusted or worked, as circumstances may require, and folded up out of the way in transporting the machine from place to place, and the plows allowed to yield to any obstruction which may be in their path.

In the accompanying sheet of drawings, A represents a rectangular frame, which is mounted on two wheels, B B, and has a driver's seat, C, on its rear part.

The frame A is braced by oblique bars, D D, and has a draught-pole, E, attached to it.

F F represent two plow-beams, the front ends of which are connected by joints, $a\,a$, to the second cross-bar, $b$, of the frame A, and G G are two plow-beams, the front ends of which are connected by joints $c$ to the front cross-bar, $d$, of the frame A. These joints are formed of staples, which are driven in the cross-pieces passing through holes in the front parts of the plow-beams, and the holes $e$, in the beams G G, are made oblong, to admit of said beams being worked or moved laterally and longitudinally. (See fig. 1.)

The others beams, F F, do not require to have this movement, and consequently the holes in them, through which the staples pass, are only large enough to allow the staples to pass through.

Figure 1:
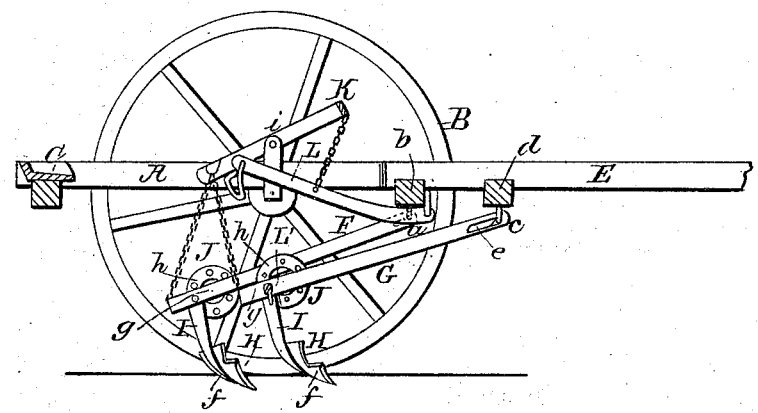
Figure 1 is a side sectional view of my invention, taken in the line $x\,x$, fig. 2.
Figure 2:
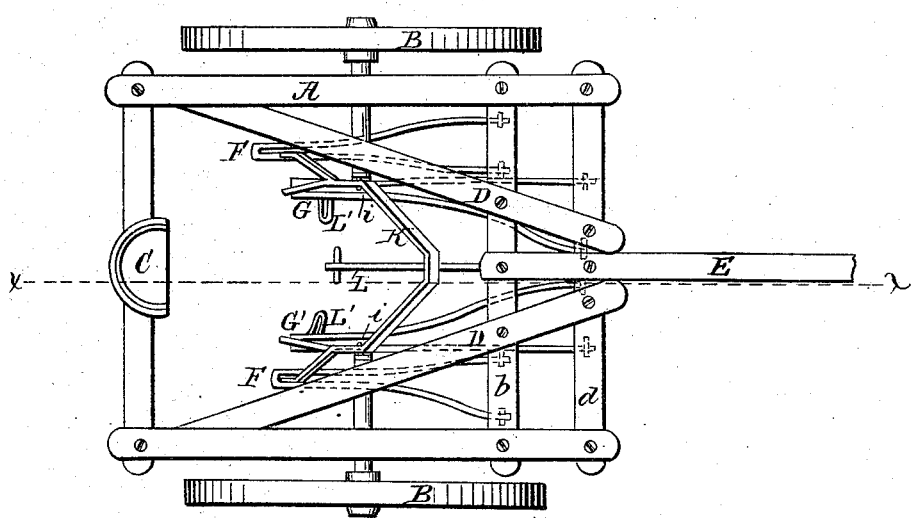
Figure 2 is a plan or top view of the same.

H represents the plows, which are notched at each side, as shown at $f$ in fig. 1. These plows are at the lower ends of standards I, the upper ends of the latter being provided with perforated segments, J.

These standards I are pivoted in the beams F G, as shown at $g$, and a wooden pin, $h$, is passed through one of the holes in the segments, in order to retain the plow-standards at a greater or less angle, as may be required, the depth of the furrows being regulated by this means.

In case of a plow meeting with any obstruction, such as a root, stump, or stone, the wooden pin $h$, which passes through the segment of the standard of said plow, will break and allow the plow to pass over the obstruction, and in transporting the cultivator from place to place, the plows may be turned up, and the standards I secured in close proximity to the beams, so as to be entirely out of the way.

K represents a bow-shaped lever, which is pivoted in the frame A, as shown at $i\,i$, and L is a treadle, the front end of which is pivoted to the second cross-bar $d$, the rear end extending back within convenient reach of the driver, on seat C. By depressing this lever at any time, all of the plow-beams may be raised simultaneously.

The two inner beams, G G, may be moved laterally by the driver, by means of his feet, said beams being provided, at their rear ends, with stirrups L'.

The plows of the inner beams G G are formed with a curve to throw the earth at one side, and the earth may be cast either towards or from the plants, as desired, by shifting them from one beam to the other, as circumstances may require.

Having thus described my invention,

I claim as new, and desire to secure by Letters Patent—

1. The bow-shaped lever K, in connection with the treadle L, combined and arranged substantially as and for the purpose specified.

2. The connecting of the beams G G of the inner plows H by means of staples passing through oblong slots, $e$, to admit of the lateral movement of said plows, substantially as set forth.

P. R. TOTTEN.

Witnesses:
JOSEPH TOTTEN,
JOHN McVAY.